No. 773,084. PATENTED OCT. 25, 1904.
C. MILLER.
TURNING MECHANISM FOR VEHICLES.
APPLICATION FILED FEB. 6, 1904.
NO MODEL. 2 SHEETS—SHEET 1.

Witnesses
Otto E. Hoddick
Dena Nelson

C. Miller
Inventor
By A. R. S. ——
Attorney

No. 773,084. PATENTED OCT. 25, 1904.
C. MILLER.
TURNING MECHANISM FOR VEHICLES.
APPLICATION FILED FEB. 6, 1904.
NO MODEL. 2 SHEETS—SHEET 2.

Witnesses
Otto E. Hoddick
Dena Nelson

C. Miller,
Inventor

Attorney

No. 773,084. Patented October 25, 1904.

UNITED STATES PATENT OFFICE.

CONRAD MILLER, OF DENVER, COLORADO.

TURNING MECHANISM FOR VEHICLES.

SPECIFICATION forming part of Letters Patent No. 773,084, dated October 25, 1904.

Application filed February 6, 1904. Serial No. 192,427. (No model.)

*To all whom it may concern:*

Be it known that I, CONRAD MILLER, a citizen of the United States of America, residing in the city and county of Denver, State of Colorado, have invented certain new and useful Improvements in Turning Mechanism for Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in turning mechanism or gears for vehicles; and it consists of an improvement whereby the ordinary bolster and fifth-wheel construction are dispensed with, thus permitting a very short turn to be made with the vehicle when desired.

This improvement embodies a construction whereby the pole or tongue of the vehicle is extensible, so that as a very short turn is made the tongue is extended and the horses hitched to the vehicle permitted to go far enough away to prevent the horse on the turning side from coming in contact with the wheel of the vehicle.

The invention also embodies a special cross-link construction of bolster which harmonizes with the other mechanism of the turning device and with the special construction of forward axle necessary thereto.

Having briefly outlined my improved construction as well as some of the functions it is intended to perform, I will proceed to describe the same in detail, reference being made to the accompanying drawings, in which is illustrated an embodiment thereof.

Figures 1, 2:
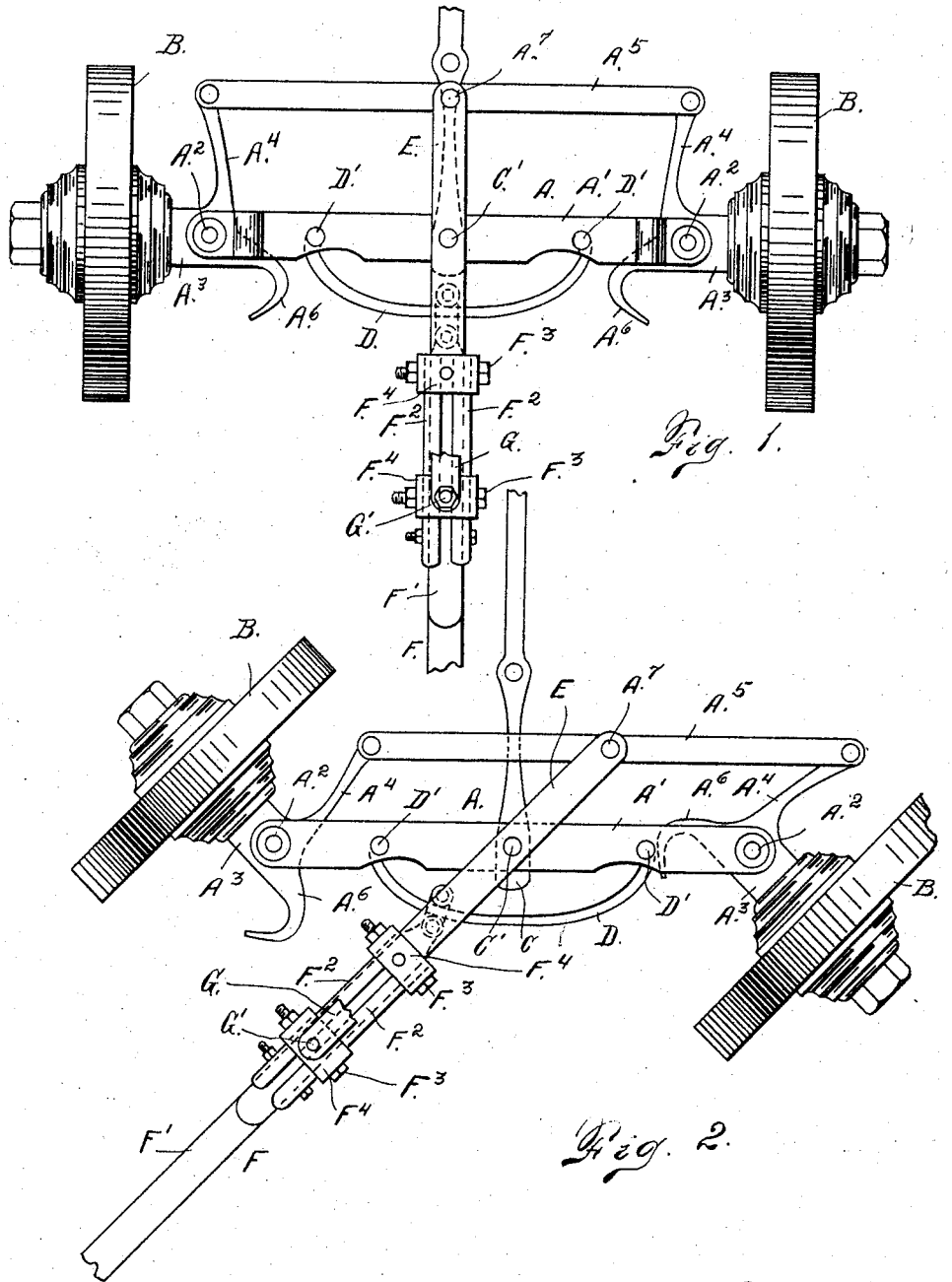
Figure 4:
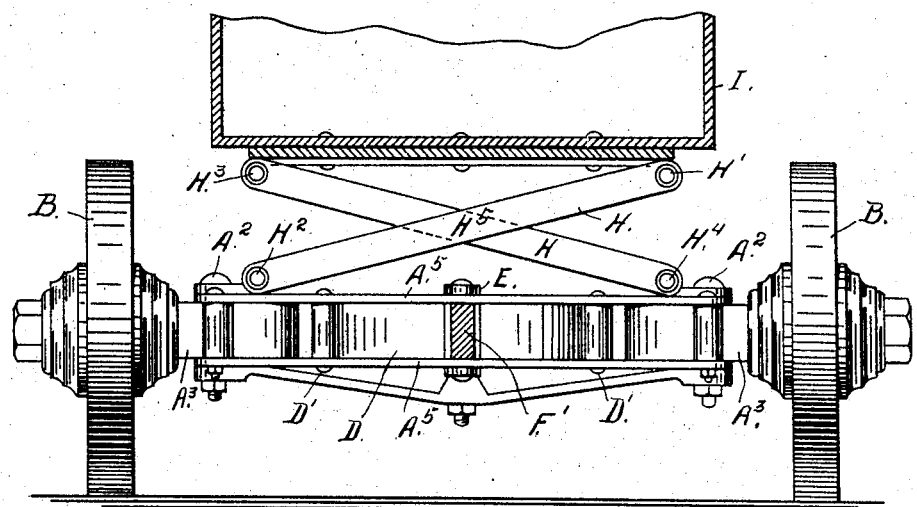
Figure 3:
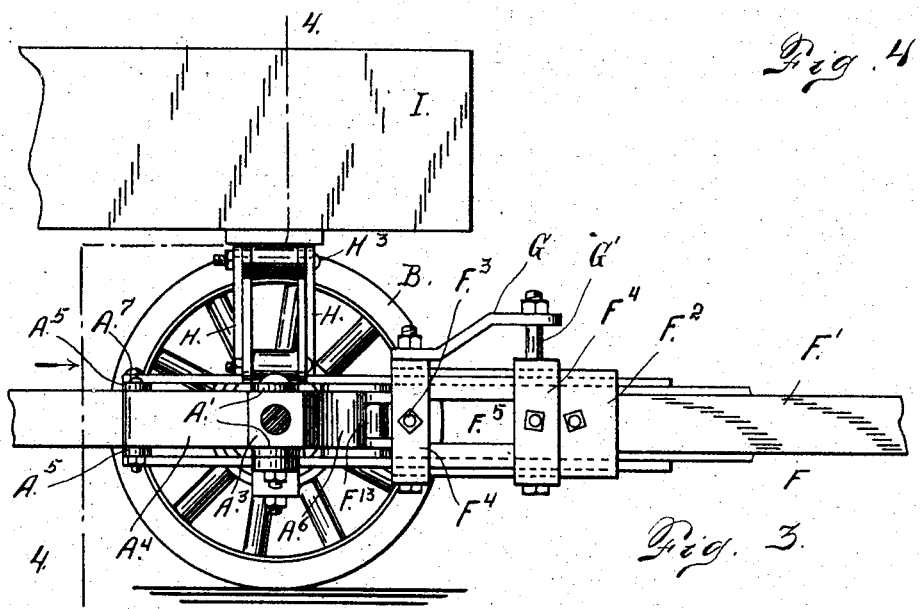
Figure 5:
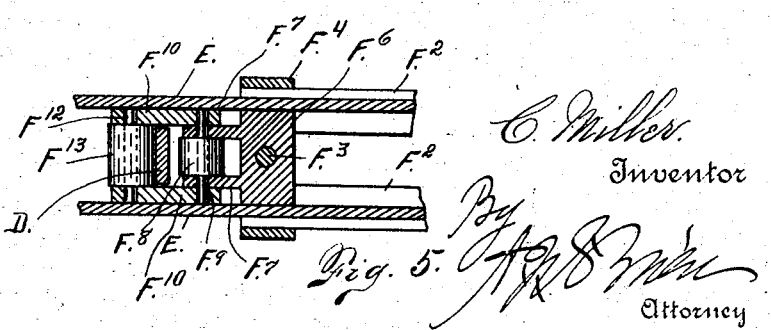

In the drawings, Figure 1 is a top or plan view of my improved turning gear or mechanism. Fig. 2 is a similar view showing the mechanism turned at an angle of about forty-five degrees to what may be termed the "direct" course of the vehicle. Fig. 3 is a fragmentary side view of a vehicle equipped with my improvements, the wagon-body being shown in place, one wheel being removed and the journal shown in section. Fig. 4 is a rear view of the same or a section taken on the line 4 4, Fig. 3, looking in the direction of the arrow. Fig. 5 is a vertical section taken through the operating parts of the extensible tongue mechanism.

The same reference characters indicate the same parts in all the views.

Let A designate the body of the front axle of the vehicle, the same being composed of two vertically-separated parallel bars $A'$, between whose extremities are pivotally mounted, as shown at $A^2$, two stub-axles $A^3$, upon which the wheels B are journaled. These axles are of sufficient vertical thickness to practically fill the space between the parallel axle-parts $A'$, but at the same time are allowed to turn freely between the two parts. The axes $A^2$ of these stub-axles, as shown in the drawings, consist of vertically-disposed bolts passing through registering apertures formed in the said axles and the extremities of the parts $A'$.

The axle parts $A'$ are relatively stationary, and passing between their center is a reach C, which is rigidly secured to the said axle parts by means of a bolt $C'$. This reach may be of any desired length.

Each stub-axle $A^2$ is provided with a rearwardly-projecting arm $A^4$, to whose rear extremities are pivotally connected two vertically-separated parallel bars $A^5$, each of which forms with one of the axle-bars $A'$ approximately a parallelogram having approximately right or oblique angles according to the position of the turning-gear—that is to say, whether it is in the position shown in Fig. 1 or Fig. 2 of the drawings. Each stub-axle is further provided with a curved projection $A^6$, one of which is adapted to pass between the axle parts $A'$, which form guides for the stub-axles and have a tendency to maintain the said axles in their proper operative relation with the body portion of the axle, composed of the body parts $A'$. Between the axes of the stub-axles is a curved plate D, whose width is equal to the space between the axle parts $A'$. This part D curves forwardly from the axle parts $A'$, and its extremities are rigidly secured to the axle parts A' by rivets D' or other suitable fastening devices adapted to hold the part D rigidly in place. Pivotally connected with the parallel bars $A^5$ at a central point $A^7$ are two vertically-separated forwardly-extending parallel bars E, which are fulcrumed on the bolt C', straddle the curved part D, and extend forwardly beyond the same. The rear portion of the vehicle-tongue F is slidably mounted on the lever-like bars E, and to this end the body F' of the tongue is provided with two metal side pieces $F^2$, which are secured to the body of the tongue by horizontally-disposed bolts $F^3$, which pass through metal loops $F^4$. Above and below the body part of the tongue F the latter is embraced by the bars E, which pass through the loops $F^4$ and are also embraced by the overlapping flanges or angle parts of the plates $F^2$. By virtue of this construction the tongue is slidably mounted on the bars E. The part F' of the tongue does not extend rearwardly beyond the forward metal strap $F^4$, and in the rear of this strap the metal side plates $F^2$ are slotted, as shown at $F^5$, to allow the projections $A^6$ of the stub-axles to enter when a very short turn is made. The plates $F^2$ thus form the rear portion of the body of the tongue. Between the rear extremities of the metal parts $F^2$ is a metal block $F^6$, which is rigidly secured to the plates $F^2$ and the rear strap $F^4$ by one of the horizontally-disposed bolts $F^3$. This block $F^6$ is provided with two rearwardly-extending separated lugs $F^7$, between which is located a roller $F^8$, mounted on a pin $F^9$, passed through registering apertures formed in two vertically-separated links $F^{10}$ and the lugs $F^7$. The rear extremities of these links are connected with a pin $F^{12}$, upon which is mounted a roller $F^{13}$, which separates the links. The rollers $F^8$ and $F^{13}$ are thus provided with vertically-disposed axes, and between these rollers is located the curved plate D, to which the pull on the tongue is applied when the vehicle is moved. Attention is called to the fact that the curve of the plate D describes an arc of considerably greater radius than the distance between the center of the pin $A^7$, where the rear extremities of the bars E are pivoted, and the center of the plate D. Hence as the tongue is moved in either direction from the straight-line position (shown in Fig. 1) the roller $F^8$ will be engaged by the forward surface of the bar D and the tongue moved forwardly on the bars E, thus allowing the horse on the turning side of the tongue to get away from the wheel on that side, while when the tongue is turned back to the straight-line position the rear surface of the curved bar D will engage the roller $F^{13}$ and move the tongue rearwardly on the bars E until it assumes its normal position.

As shown in the drawings, a clevis-piece G is bolted to the rear strap $F^4$. Its forward extremity is bent upwardly and is provided with an opening through which is passed a bolt G' for holding the doubletree (not shown) in place.

The bolster used in connection with my improved turning mechanism, as shown in the drawings, consists of two pairs of parallel horizontally-separated cross-bars or links H. The upper extremities of one pair of links H are pivotally connected with the wagon-body support, as shown at H', while the lower extremities of the same pair of links are pivotally connected with the rigid portion of the axle, as shown at $H^2$. The upper extremities of the other pair of links H are pivotally connected with the wagon-body support, as shown at $H^3$, on the side opposite from the pivot H', while the lower extremities of the last-named pair of links are connected with the rigid portion of the axle, as shown at $H^4$, on the opposite side of the wagon from the pivot $H^2$. These two pairs of links cross each other in the center, as shown at $H^5$. It will thus be seen that either forward wheel B of the vehicle may be raised or lowered with reference to the other wheel, while the body I of the vehicle remains in the horizontal position.

Having thus described my invention, what I claim is—

1. In a turning gear or mechanism for vehicles, the combination of a relatively stationary axle portion, stub-axles pivotally connected with the extremities of the said axle portion, the stub-axles having rearwardly-projecting parts, a bar having its extremities pivotally connected with the said stub-axle projections, a bar pivotally connected with the center of the bar connecting the stub-axle projections, fulcrumed on the central portion of the relatively stationary axle part and extending forwardly therefrom, a curved bar rigidly connected with the stationary axle part, and whose curve describes an arc of greater radius than the distance between the pivotal point of the rear extremity of the forwardly-extending bar and the center of the said curved bar, a tongue slidably connected with the forwardly-extending bar and having its rear extremity yoked to the curved bar, whereby as the tongue is turned with the forwardly-extending bar, it is moved back and forth thereon by virtue of its connection with the curved bar, substantially as described.

2. In a turning-gear for vehicles, the combination of a relatively stationary axle part, stub-axles pivotally connected with the extremities thereof and having rearwardly-projecting parts, a transverse bar whose extremities are pivotally connected with the stub-axle projections, a forwardly-extending bar pivotally connected with the center of the transverse bar, extending forwardly therefrom and fulcrumed at the center of the stationary axle part, a curved bar rigidly connected with the stationary axle part and extending forwardly therefrom, a tongue slidably mounted on the forwardly-extending bar, a pair of links connected with its rear extremity, the said links straddling the curved bar, and rollers connected with the two links on opposite sides of the curved bar, the arc of the curved bar being of greater radius than the distance between the pivotal point on the rear extremity of the forwardly-extending bar, and the center of the curved bar when the tongue is in the straight-line position, the arrangement of the links and their rollers being such, that as the tongue is turned in either direction from the straight-line position, the curved bar moves the tongue forwardly on the forwardly-extending bar, and moves the tongue rearwardly on the forwardly-extending bar as the tongue is returned to the straight-line position.

3. The combination of a relatively stationary axle part composed of two vertically-separated members, stub-axles pivotally connected with the extremities of the stationary axle part and located between its vertically-separated members, the said stub-axles having rearwardly-projecting parts, two vertically-separated parallel transverse bars connecting the rearwardly-extending parts of the stub-axles, a pair of vertically-separated forwardly-extending bars having their rear extremities pivotally connected with the center of the transverse bars, the forwardly-extending bars being fulcrumed at the center of the stationary axle part, a curved bar whose extremities pass between the members of the stationary axle part and are rigidly connected therewith, a tongue whose rear portion is slidably mounted on the forwardly-extending bars, a yoke pivotally connected with the rear extremity of the tongue and straddling the curved bar, the arc described by the curve of the latter having a greater radius than the distance between the point where the rear extremities of the forwardly-extending bars are connected with the transverse bars, and the center of the curved bar, when the tongue and forwardly-extending bars are in the straight line or central position.

4. The combination of a stationary axle part having two vertically-separated members, and stub-axles passing between the said bars and pivotally connected with their extremities, the said axles having parts which extend forwardly and inwardly and are arranged to pass between the vertically-separated stationary axle members when the wheels are turned, substantially as described.

5. The combination of a relatively stationary axle part composed of two vertically-separated members, stub-axles located between the extremities of these members and pivotally connected therewith, the said axles having parts which extend inwardly and forwardly, and also rearwardly-projecting parts, a bar having its extremities pivotally connected with the rearwardly-extending parts of the stub-axles, and a tongue whose rear extremity is pivotally connected with the said bar, and fulcrumed on the stationary part of the axle.

6. The combination of a relatively stationary axle part, a bar pivotally connected with the center of said part, a tongue slidably connected with said bar, and a suitable connection between the tongue and the axle, whereby as the tongue and bar are turned on the axle-pivot as a center, the tongue will be moved back and forth on the said bar.

7. The combination of an axle, a bar pivotally connected with the central portion of the axle and extending forwardly therefrom, a tongue slidably connected with the bar, a curved bar having its extremities rigidly connected with the axle, and having a curve of greater radius than the distance between the pivot of the forwardly-extending bar and the center of the curved bar, and a yoke connecting the rear extremity of the tongue with the curved bar, substantially as described.

In testimony whereof I affix my signature in presence of two witnesses.

CONRAD MILLER.

Witnesses:
 DENA NELSON,
 A. J. O'BRIEN.